(12) United States Patent
Crespo

(10) Patent No.: US 8,209,830 B1
(45) Date of Patent: Jul. 3, 2012

(54) DUAL DRILL AND ANCHORING DEVICE

(76) Inventor: Rusbel T. Crespo, Miami, FL (US)

(*) Notice: Subject to any disclaimer, the term of this patent is extended or adjusted under 35 U.S.C. 154(b) by 738 days.

(21) Appl. No.: 12/410,289

(22) Filed: Mar. 24, 2009

(51) Int. Cl.
*B23P 23/00* (2006.01)

(52) U.S. Cl. ............... 29/26 A; 7/138; 7/158; 7/165; 30/500; 408/117

(58) Field of Classification Search .......... 7/138, 158, 7/165, 170; 173/216, 170; 30/500; 29/34 B, 29/26 A; 408/35, 117, 118, 20, 22
See application file for complete search history.

(56) References Cited

U.S. PATENT DOCUMENTS

| | | | |
|---|---|---|---|
| 1,142,482 A * | 6/1915 | Bisch | 310/89 |
| 3,286,776 A * | 11/1966 | Richison et al. | 173/48 |
| 3,472,052 A | 10/1969 | Chance | |
| 4,165,946 A | 8/1979 | Andersson | |
| 4,171,083 A * | 10/1979 | Lippacher et al. | 227/69 |
| 4,299,004 A * | 11/1981 | Lancaster | 15/97.1 |
| D269,407 S | 6/1983 | Ekener | |
| 4,627,140 A | 12/1986 | Davis | |
| 4,989,480 A * | 2/1991 | Chen | 81/439 |
| 5,050,286 A | 9/1991 | Miyanaga | |
| 5,149,230 A * | 9/1992 | Nett | 408/42 |
| 5,316,415 A * | 5/1994 | Chiu | 408/24 |
| 5,368,419 A * | 11/1994 | Imus | 408/67 |
| 6,851,492 B2 | 2/2005 | Sato | |
| 7,065,855 B2 | 6/2006 | Janusz | |
| 2002/0124371 A1 | 9/2002 | Livingston | |
| 2003/0145388 A1* | 8/2003 | Rahmsdorf et al. | 7/158 |

* cited by examiner

*Primary Examiner* — Daniel Howell
*Assistant Examiner* — Justin Sikorski

(57) ABSTRACT

A dual drill and anchoring device comprising a first shaft; a first bevel gear on the first shaft; a second shaft positioned 90 degrees from the first shaft; a second bevel gear slidably disposed on the second shaft wherein that the rotation of the first shaft can be translated to a rotation of the second shaft; a first ram fixedly attached to the second shaft, a first ram protrusion of the first ram and a ram engage nut for engaging the first ram protrusion, wherein when the first ram rotates in a first direction the ram engage nut moves down the first ram protrusion; and an anchor ram with a well for accommodating the protrusion and an anchor ram protrusion that protrudes away from the first ram.

3 Claims, 8 Drawing Sheets

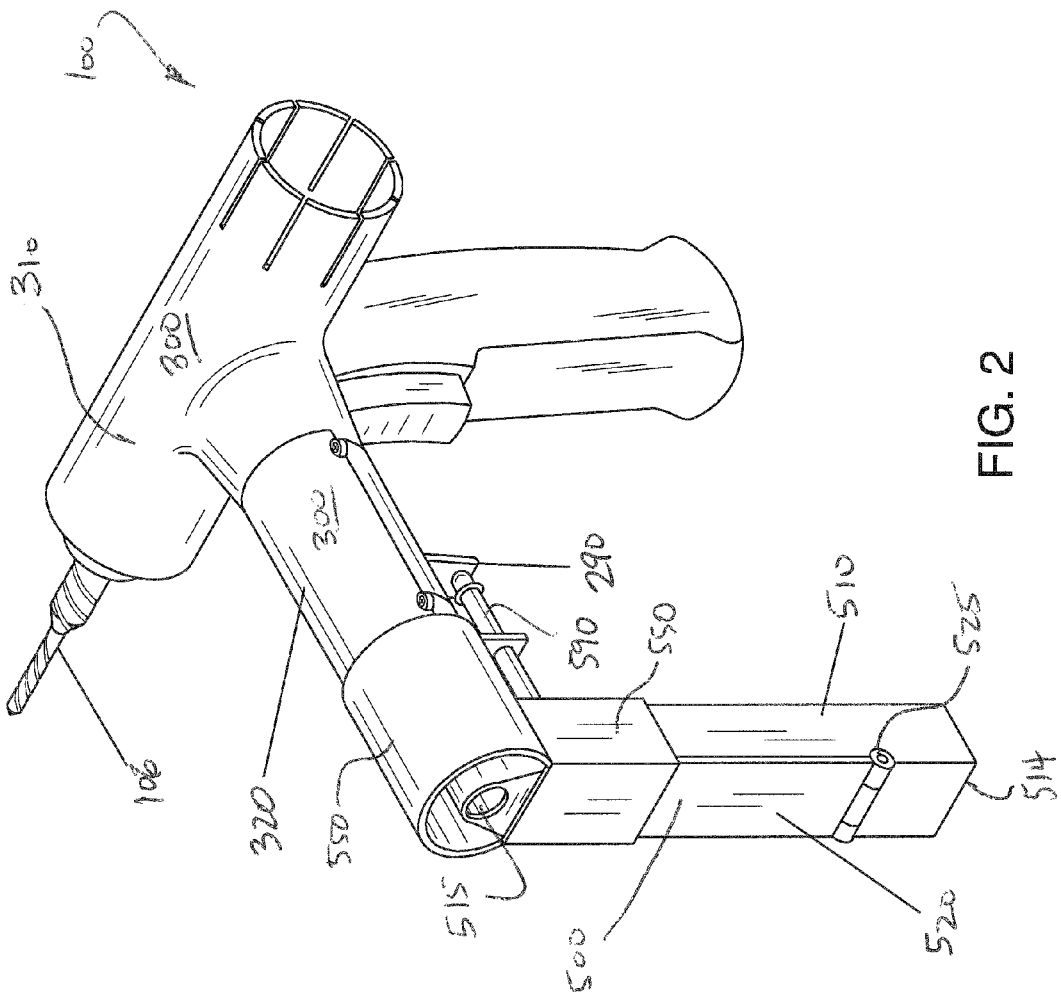
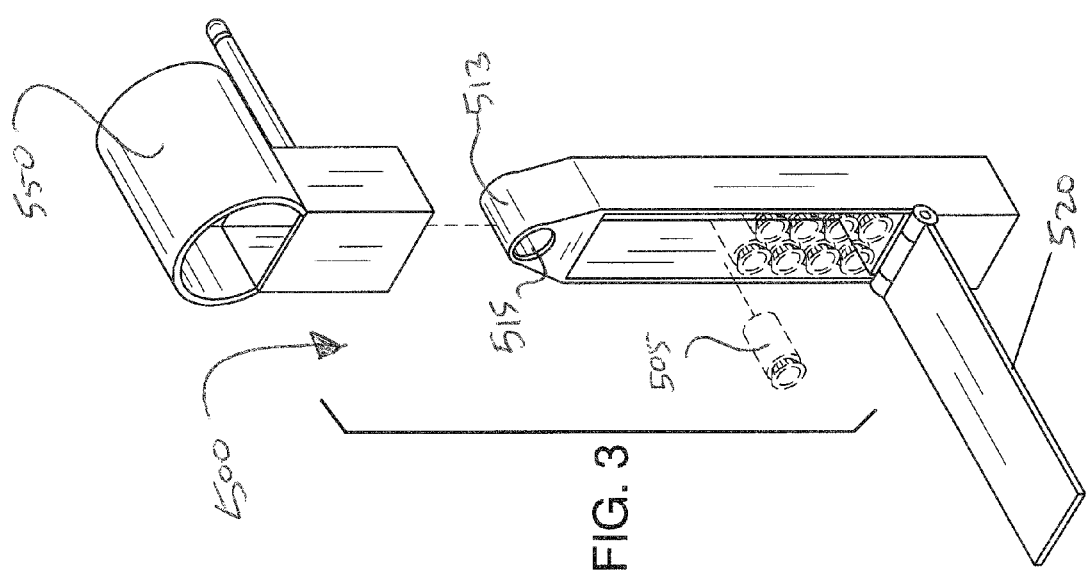

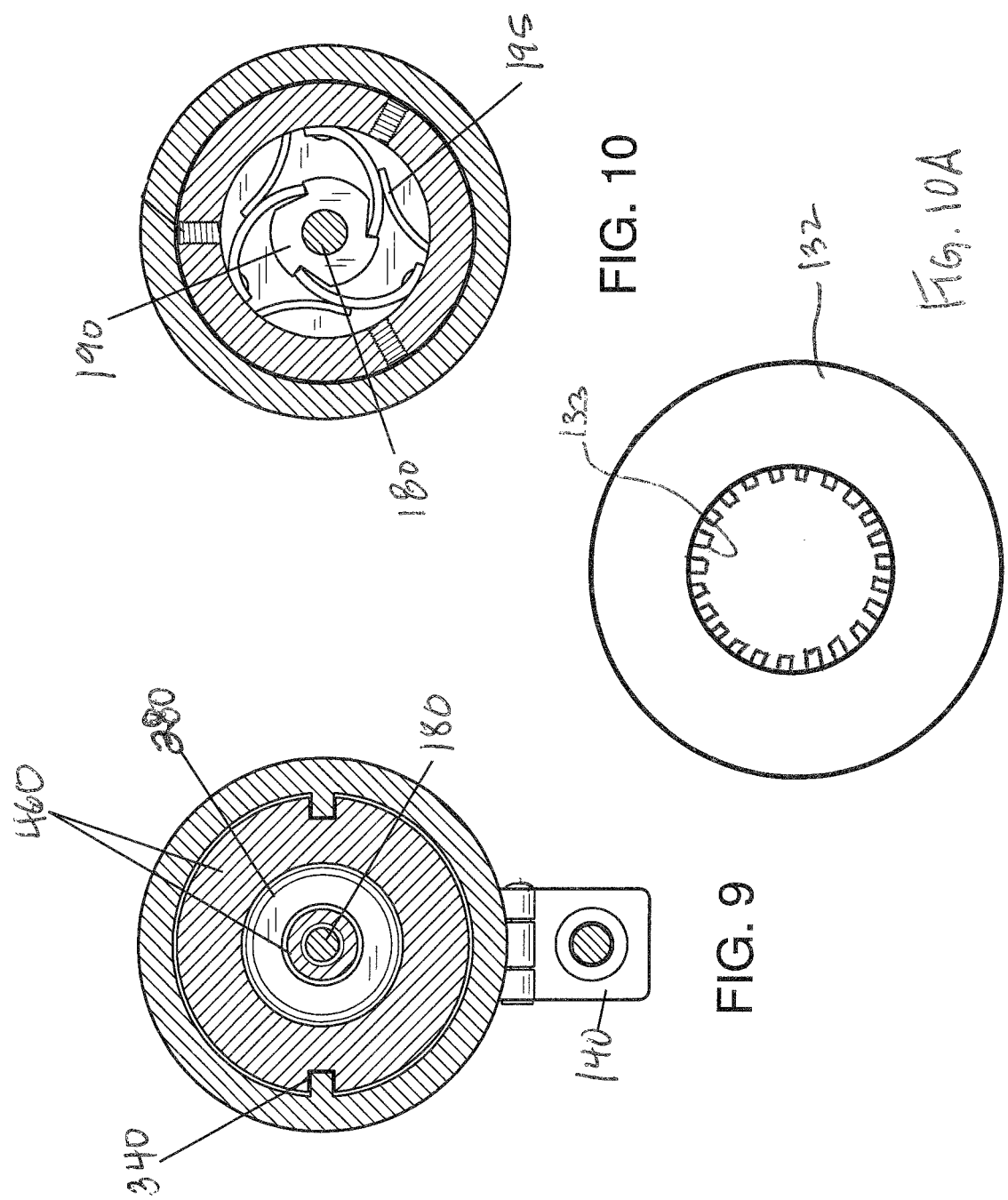

DUAL DRILL AND ANCHORING DEVICE

FIELD OF THE INVENTION

The present invention is directed to a tool used for both drilling and for the installation of anchors.

BACKGROUND OF THE INVENTION

It can be time consuming and cumbersome to use two different tools for drilling and installing anchors. The present invention features a dual drill and anchoring device that can both drill and assist a user in installing anchors.

Any feature or combination of features described herein are included within the scope of the present invention provided that the features included in any such combination are net mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 2 is a back perspective view of the dual drill and anchoring device of the present invention.

FIG. 3 is a perspective view of the anchor holder of the dual drill and anchoring device of the present invention.

FIG. 9 is a front and cross sectional view of the dual drill and anchoring device of the present invention.

FIG. 10 is a front and cross sectional view of the dual drill and anchoring device of the present invention.

FIG. 10A is a cross sectional view of the geared internal ring of the second bevel gear.

DESCRIPTION OF PREFERRED EMBODIMENTS

Figure 1:
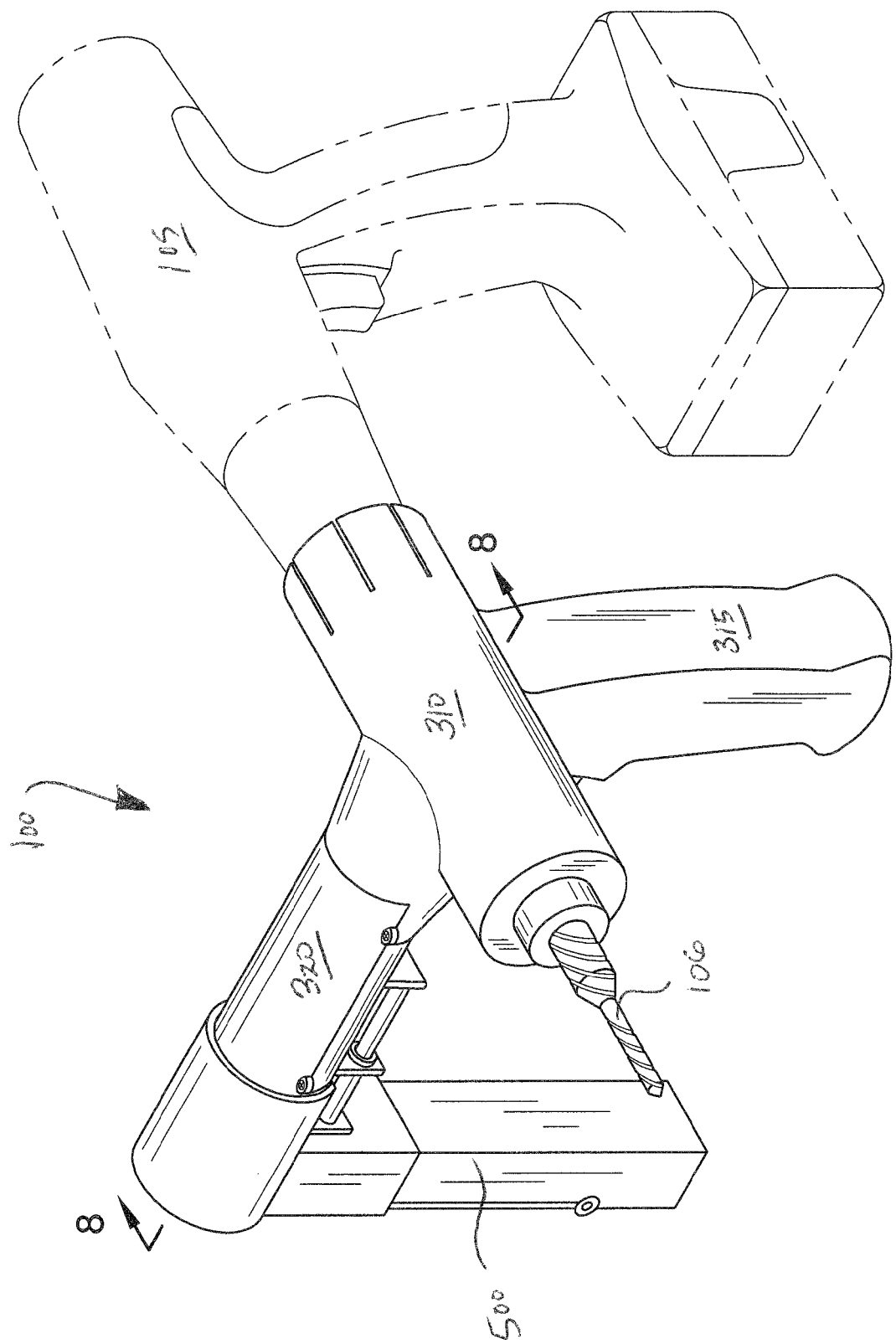
FIG. 1 is a front perspective view of the dual drill and anchoring device of the present invention.
Figure 4:
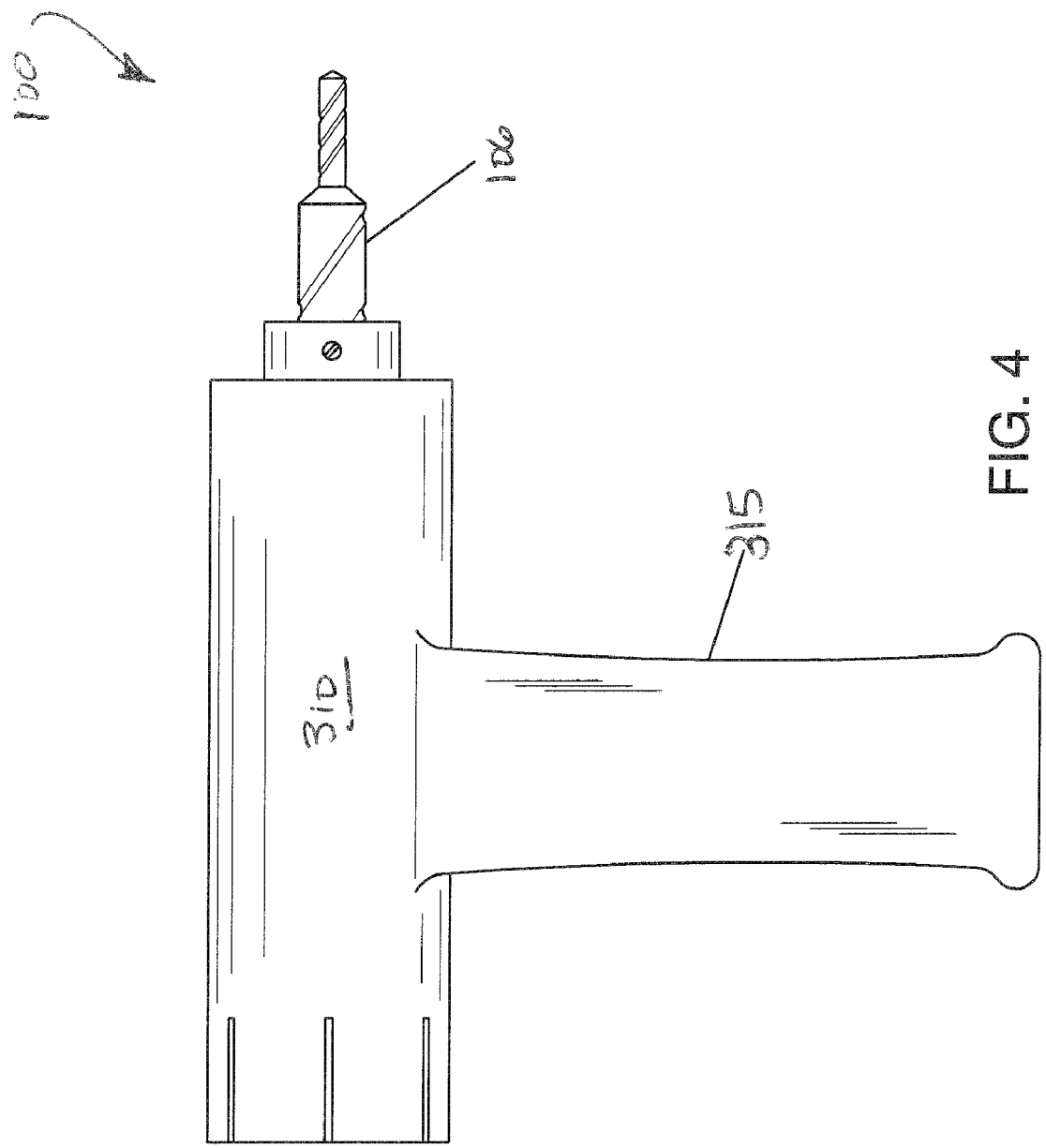
FIG. 4 is a side view of the dual drill and anchoring device of the present invention.
Figure 5:
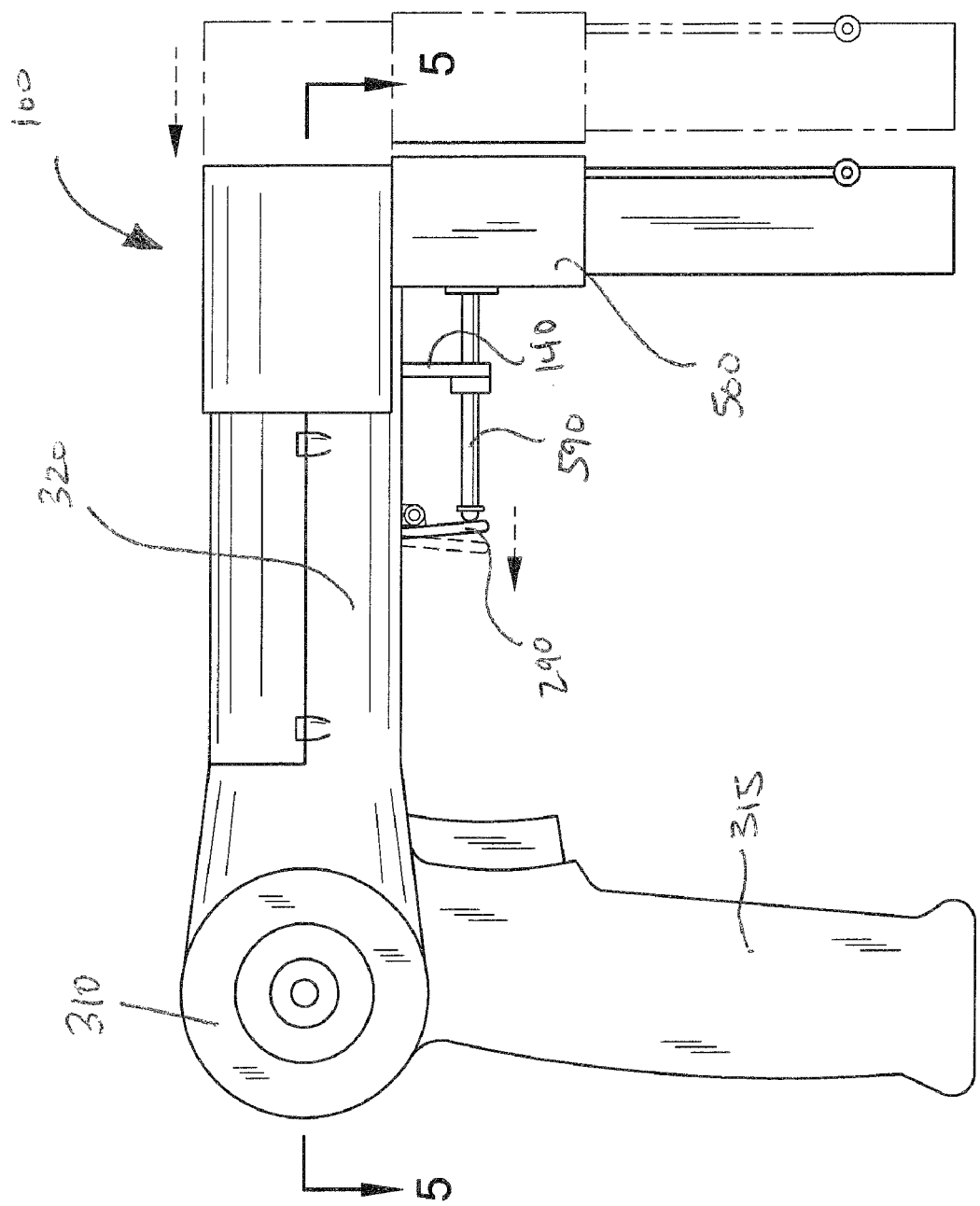
FIG. 5 is a side and cross sectional view of the dual drill and anchoring device of the present invention.
Figure 6:
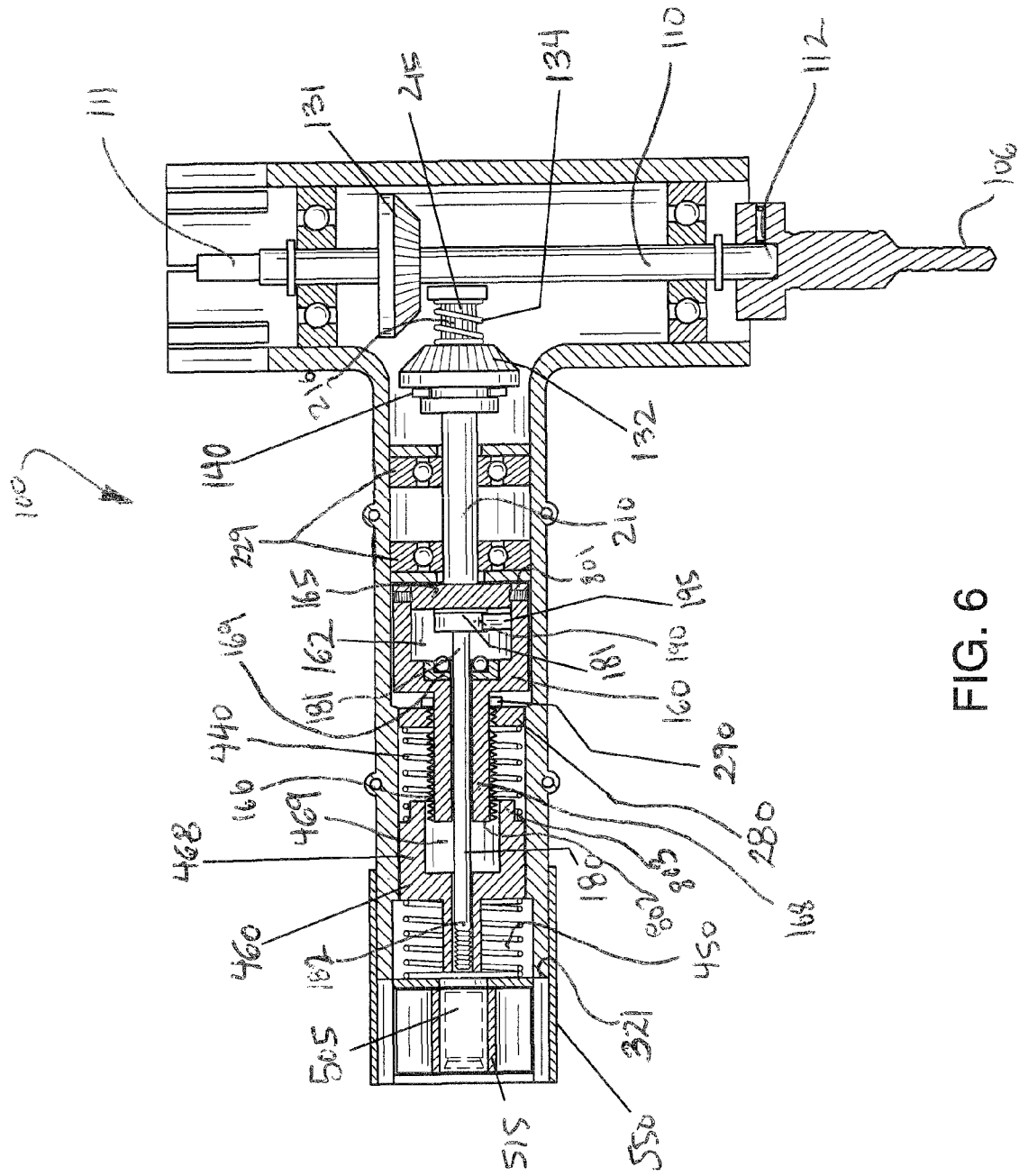
FIG. 6 is a top and cross sectional view of the dual drill and anchoring device of the present invention.
Figure 7:
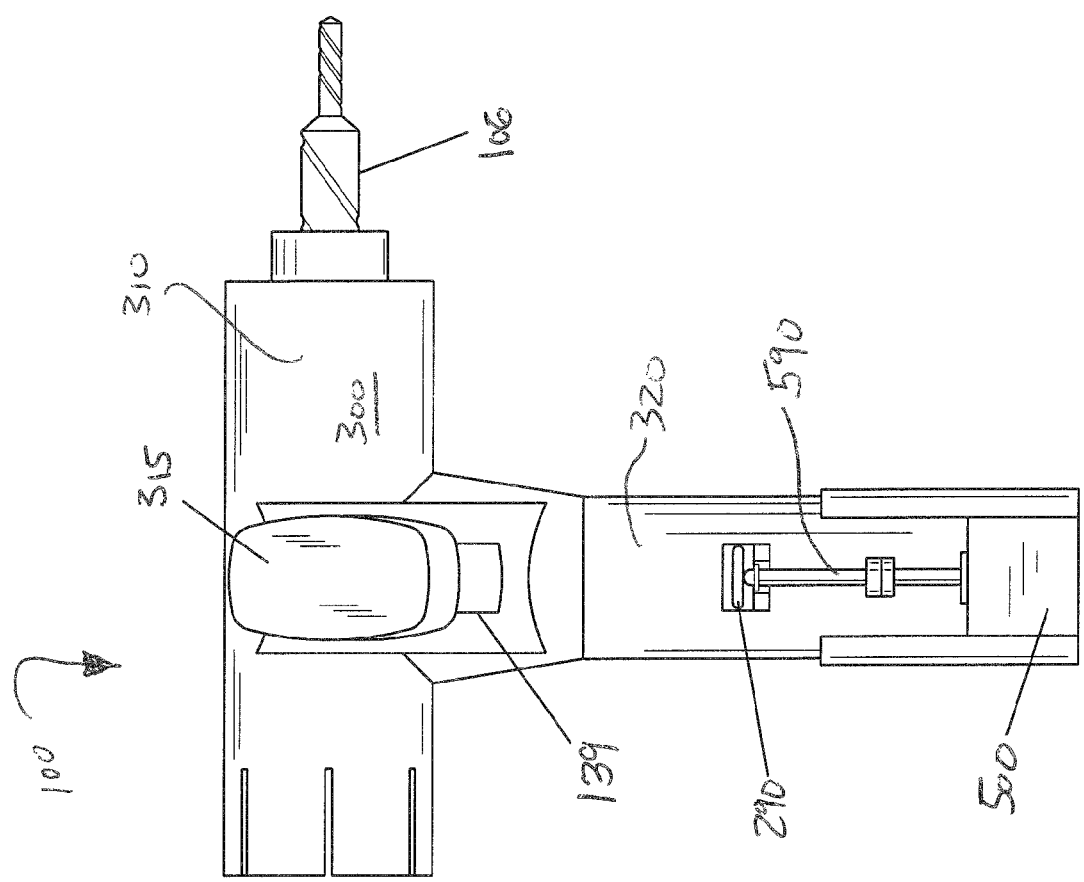
FIG. 7 is a bottom view of the dual drill and anchoring device of the present invention.
Figure 8:
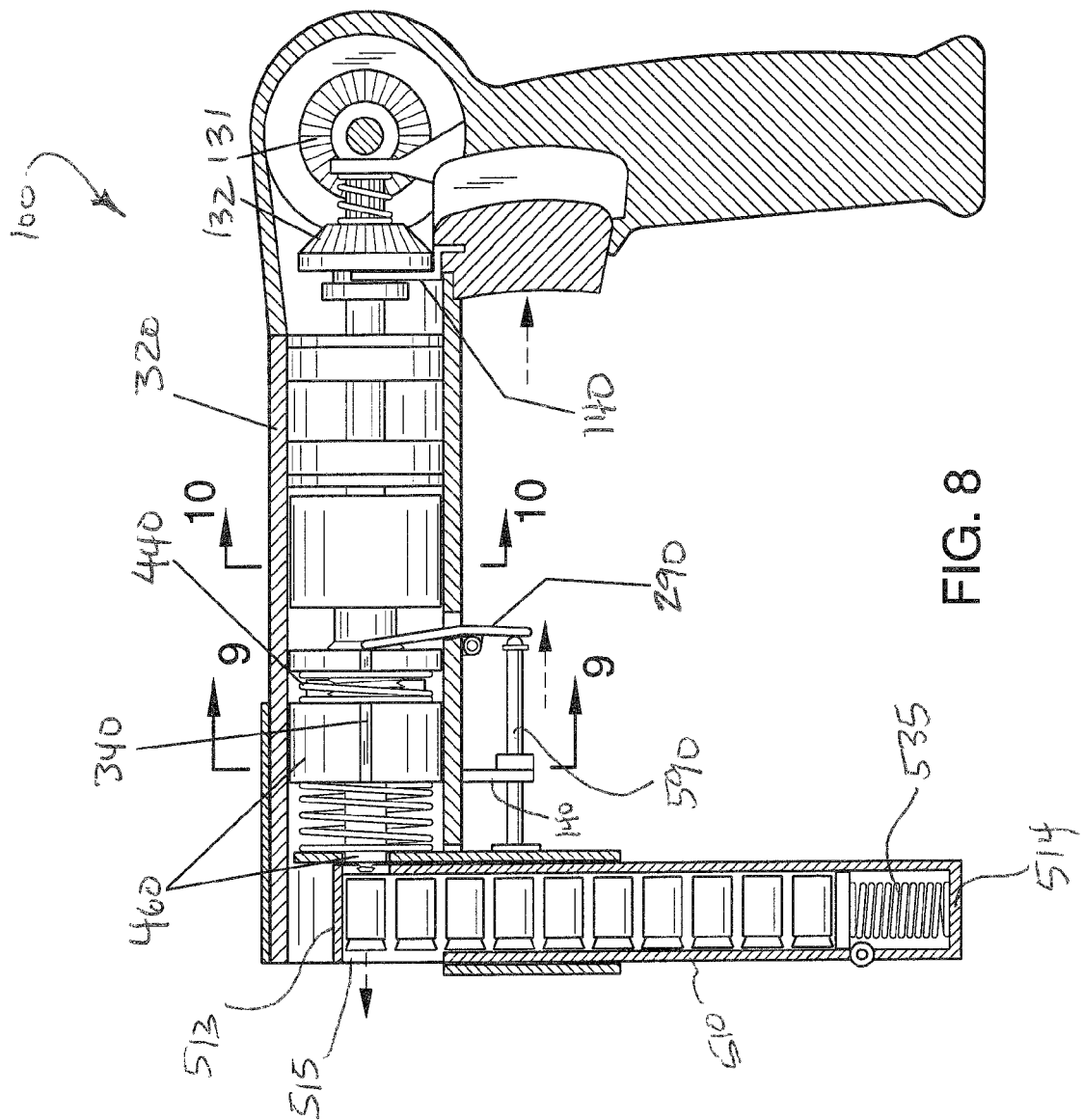
FIG. 8 is a side and cross sectional view of the dual drill and anchoring device of the present invention.

Referring now to FIGS. 1-10, the present invention features an dual drill and anchoring device 100 for use with a drill 105 (e.g., hammer drill) to facilitate the installation of an anchor 210.

The dual drill and anchoring device 100 of the present invention comprises a first shaft 110 having a first end 111 and a second end 112. The first end 111 is adapted for engaging with a chuck of an electric drill 105. The second end 112 is for securing a drill bit 106. The first shaft 110 is for drilling a drill bit 106 into a wall or other similar surface. When a user activates the drill 105, the first shaft 110 rotates so as to drive the drill bit 106 in or out of the wall or other surface.

A first bevel gear 131 is locked and disposed on the first shaft 110. A second shaft 210 having a first end 211 and a second end 212 is positioned at about a 90 degree angle from the first shaft 110. In some embodiments, the second shaft 210 is oriented about halfway between the first end 111 and the second end 112 of the first shaft 110. In some embodiments, the second shaft 210 is closer to the second end 112 or is closer to the first end 111 of the first shaft 110.

The first end 211 of the second shaft 210 comprises a geared shaft end 215. The geared shaft end 215 is formed with grooves running along the length of the second shaft 210.

A second bevel gear 132 is slidably disposed on the second shaft 210 near the geared shaft end 215. The second bevel gear 132 has a geared internal ring 133. The second bevel gear 132 can move between an engaged position and a disengaged position. In some embodiments, the second bevel gear 132 is biased in the disengaged position caused by an engage release spring 134. The engage release spring 134 surrounds the geared shaft end 215. In some embodiments, a trigger 139 can move the second bevel gear 132 to the engaged position. In some embodiments, the second shaft 210 is surrounded by ball bearings 229.

In the engaged position, the second bevel gear 132 is pushed towards the first end 211 of the second shaft 210 (e.g., the toward the first shaft 110) and the internal ring 133 engages the grooves 216 of the geared shaft end 215. The second bevel gear 132 can be moved to the engaged position via a gear engage bar 140. When in the engaged position, the geared internal ring 133 of the second bevel gear 132 snugly engages with the geared shaft end 215 such that the rotation of the first shaft 110 about its axis along its length can be translated to a rotation of the second shaft 210 about its axis along its length.

The dual drill and anchoring device 100 of the present invention further comprises a first ram 160 comprising a housing with a first ram base 165 fixedly attached to the second shaft 210. The first ram 160 further comprises a first ram protrusion 168 with a first ram channel disposed therein. The first ram channel fluidly connects an opening of the first ram protrusion 168 to a chamber 162 within the first ram (e.g., ram housing).

An anchor rod 180 is disposed within the first ram channel. The anchor rod 180 has a first end 181 and a second end 182. In some embodiments, an anchor rod bearing 169 surrounds the anchor rod 180. A clutch plate 190 is secured to the first end 181 of the anchor rod. The clutch plate 190 compresses against the base 165 of the first ram 160. When the first ram 160 rotates along the axis of the length of the second shaft 210 in a counter clockwise direction as viewed from the second end 182 of the anchor rod 180 to the first end 181 of the anchor rod 180, the first ram base 165 causes the clutch plate 190 (and the anchor rod 180) to rotate counter clockwise via friction be en the clutch plate 190 and the first ram base 165.

When the first ram 160 rotates along the axis of the length of the second shaft 210 in a clockwise direction as viewed from the second end 182 of the anchor rod 180 to the first end 181 of the anchor rod 180, a set of clutch leafs 195 catches on the clutch plate 190 and causes the clutch plate 190 (and the anchor rod 180) to rotate clock-wise. In some embodiments, the first ram 160 has a first end 801 and a second end 802

The device 100 of the present invention further comprises a ram engage nut 280 with an interior threading sized to engage a threading 166 disposed on the outside of the first ram protrusion 168. When the first ram 160 rotates in a counter clockwise direction as viewed from the second end 182 towards the first end 181 of the anchor rod 180, the ram engage nut 280 moves down the protrusion 168 to rd the opening of the first ram protrusion 168. In some embodiments, the ram engage nut 280 can be engaged with the threading of the first ram protrusion 168 via a nut engage bar 290.

The device 100 of the present invention further comprises an anchor ram 460 comprising a base and a wall 468 extending towards the first ram protrusion 168. The wall 468 forms a well 469 sized to accommodate the first ram protrusion 168. The anchor ram 460 further comprising an anchor ram protrusion 168 that protrudes in the direction away from the first ram 160. In some embodiments, the anchor ram 460 has a first end 803.

The first shaft 110 and the second shaft 210 are disposed in a housing 300. The housing 300 is generally T-shaped, having a top end 310 and a vertical portion 320. The first shaft 110 is disposed within the top portion 310 of the housing 300, and the second shaft 210 is disposed within the vertical portion 320 of the housing 300. The vertical portion 320 of the housing 300 comprises an anchor end 321 where there is an aperture disposed on the anchor end 321 and the aperture is sized to allow the anchor protrusion to exit.

In some embodiments, a ram groove 340 is disposed along the length of the vertical portion 320 of the housing 300 to guide the ram engage nut 280 and the anchor ram 460. The ram engage nut 280 and the anchor ram 460 each have indentations to accommodate the ram grooves 340.

In some embodiments, a nut engage spring 440 is sandwiched between the nut engage bar 280 and the anchor ram 460. In some embodiments, an anchor ram spring 450 is sandwiched between the anchor end 321 of the vertical portion 320 of the housing and the anchor ram 460.

In some embodiments, the first shaft 110 is rotatably attached inside the housing 300 (e.g., top end 310 of the housing 300) via bearings. Bearings are well known to one of ordinary skill in the art. In some embodiments, a housing handle 315 is disposed on the bottom surface of the top end 310 of the housing 300. The housing handle 315 is generally aligned with the drill handle of the drill 105.

The dual drill and anchoring device 100 of the present invention further comprises an anchor holder 500. The anchor holder 500 is for removably attaching to the anchor end 321 of the housing 300. The anchor holder 500 is for holding anchors 505.

The anchor holder 500 comprises an anchor housing 510 for storing anchors 505 in the inner cavity of the anchor housing 510. In some embodiments, the anchor housing 510 has a door 520 pivotally attached via a hinge 525. Disposed in the bottom 514 of the housing 110 is an anchor housing spring 535 for pushing the anchors 505 to the top end 513 of the anchor housing 510. The top 513 of the anchor housing 510 is generally triangular or pointed in shape such that as the anchors 505 are pushed to the top end 513 of the anchor housing 510 a single anchor 505 is positioned at the tip 515. The tip 515 is the position wherein the dual drill and anchoring device 100 can install the anchor 505 in a wall. For example, when the anchor ram 460 moves out of the anchor end 321 of the vertical portion 320 of the housing 300, the anchor 460 pushes the anchor 505 that is at the tip position 515 into a wall or other similar surface.

In some embodiments, the anchor holder 500 can be removably attached to the housing 300 (e.g., the vertical portion 320) via an attachment means 550.

In some embodiments, when the anchor holder 500 is attached to the housing 300, an nut engaging shaft 590 pushes the nut engage bar 290 so that the ram engage nut 280 is engaged with the protrusion 168.

EXAMPLE

In some embodiments, an anchor 505 is aligned with the wall (e.g., an orifice in the wall, etc) or other location according to the user's needs. In some embodiments, the drill and anchoring device 100 has a first function to drill the anchor 505 into a wall. This may be achieved by drilling the drill 105 in a first direction (e.g., clockwise). For example, the drill 105 is turned clockwise and the gear engage bar 140 is pressed to engage the second bevel gear 132 with the first bevel gear 131 such that the second shaft 210 rotates in a first direction. The clutch plate 190 rotates with friction caused by the rotation of the second shaft 210. The anchor 505 will be drilled into the wall.

In some embodiments, the device 100 has a second function to expand the anchor 505 in the wall. In some embodiments, when the anchor 505 is almost in place in the wall, the nut engage bar 290 is pressed to move the ram engage nut 280 to drive the anchor ram 460 to expand the anchor 505.

When the anchor 505 is in place, the device 100 must be removed. This is achieved by rotating the drill in the second direction (e.g., counterclockwise). The trigger 139 is pressed to engage the second bevel gear 132 with the first bevel gear 131. The second shaft 210 rotates in second direction. A ball bearing helps to untwist the anchor rod 180 from the anchor 505.

The following the disclosures of the following U.S. patents are incorporated in their entirety by reference herein: U.S. Pat. No. 3,472,052; U.S. Pat. No. 5,050,286; U.S. Pat. No. 4,627,140; U.S. Pat. No. 6,851,492 B2; U.S. Pat. No. 7,065,855 B32; U.S. Pat. No. 4,165,946; U.S. Pat. Application No. 2002/0124371 A1.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A dual drill and anchoring device, said device comprising:
  (a) a first shaft having a first end and a second end, the first end is adapted for engaging with a chuck of an electric drill, the second end is for securing a drill bit thereto;
  (b) a first bevel gear locked and disposed on the first shaft;
  (c) a second shaft having a first end and a second end, the first end of the second shaft comprises a geared shaft end, wherein the geared shaft end is formed with grooves running along the length of the second shaft, the second shaft is positioned at about a 90 degrees angle from the first shaft;
  (d) a second bevel gear slidably disposed on the second shaft, the second bevel gear has a geared internal ring, when the second bevel is pushed towards the first end of the second shaft by a gear engage bar the geared internal ring of the second bevel snugly engages with the geared shaft end such that the rotation of the first shaft about its axis along its length can be translated to a rotation of the second shaft about its axis along its length;
  (e) a first ram comprising a housing with a first ram base fixedly attached to the second shaft, the first ram further comprising a first ram protrusion with a first ram channel disposed therein, the first ram channel fluidly connects an opening of the first ram protrusion to a chamber within the first ram housing;

(f) an anchor rod disposed within the first ram channel, the anchor rod comprising a first end and a second end, a clutch plate secured to the end of the first end of anchor rod, the clutch plate compresses against the base of the first ram base, when the first ram rotates along the axis of the length of the second shaft in a counter clockwise direction as viewed from the second end of the anchor rod to the first end of the anchor rod, the first ram base causes the clutch plate (and the anchor rod) to rotate counter clockwise via friction between the clutch plate and the first ram base;

when the first ram rotates along the axis of the length of the second shaft in a clockwise direction as viewed from the second end of the anchor rod to the first end of the anchor rod, a set of clutch leafs catches on the clutch plate and causes the clutch plate and the anchor rod to rotate clock-wise;

(g) a ram engage nut with an interior threading sized to engage a threading disposed on the outside of the first ram protrusion;

when the first ram rotates in a counter clockwise direction as viewed from the second end towards the first end of the anchor rod, the ram engage nut moves down the protrusion toward the opening of the first ram protrusion;

(h) an anchor ram comprising a base and a wall extending towards the first ram protrusion, the wall forms a well sized to accommodate the first ram protrusion, the anchor ram further comprising an anchor ram protrusion that protrudes in the direction away from the first ram;

(i) a generally T-shaped housing having a top portion and a vertical portion, the first shaft is disposed within the top portion and the second shaft is disposed within the vertical portion, the vertical portion of the housing comprises an anchor end where there is an aperture disposed on the anchor end and the aperture is sized to allow the anchor protrusion to exit;

(j) a ram groove disposed along the length of the vertical portion of the housing to guide the ram engage nut and the anchor ram, wherein the ram engage nut and the anchor ram each has indentations to accommodate the grooves;

(k) a nut engage spring disposed between the ram engage nut and the anchor ram; and (l) an anchor ram spring disposed between the anchor ram and the anchor end of the housing.

2. The dual drill and anchoring device of claim 1 further comprising an anchor holder for holding anchors and for removably attaching to the anchor end of the housing.

3. The dual drill and anchoring device of claim 2, wherein a spring is disposed in a bottom of the anchor holder for pushing anchors to a tip position at a top end of the anchor holder.

* * * * *